Figure 1:
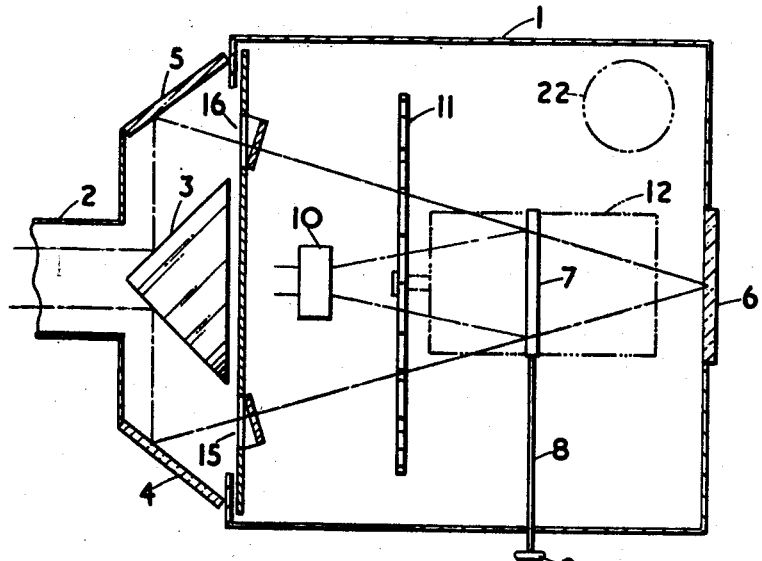

April 6, 1954

A. F. GIBSON 2,674,155

PYROMETER

Filed July 19, 1950

3 Sheets-Sheet 1

Inventor
ALAN FRANK GIBSON,
By

Attorney

April 6, 1954  A. F. GIBSON  2,674,155
PYROMETER
Filed July 19, 1950  3 Sheets-Sheet 3

Inventor
ALAN FRANK GIBSON
By
Robert H. [Lawson]
Attorney

Patented Apr. 6, 1954

2,674,155

UNITED STATES PATENT OFFICE 2,674,155

PYROMETER

Alan F. Gibson, Malvern Link, England, assignor to National Research Development Corporation, London, England, a British corporation Application July 19, 1950, Serial No. 174,652

Claims priority, application Great Britain July 30, 1949

14 Claims. (Cl. 88—22.5)

The present invention relates to pyrometer.

Known forms of pyrometers which operate by reference to the radiations from a hot body are subject to a variety of limitations and sources of error due for example to variations in the emissivity between one body and another, variations of emissivity with wavelength, reliance upon visible radiation and other factors which means that, in general, the temperature range over which the pyrometer may be used is limited, and the pyrometer must be calibrated according to the specific type of measurement for which it is to be used and/or to suit the particular conditions in which it is to be used.

The present invention has for its object to provide a form of pyrometer which enables many of these limitations and errors to be eliminated.

Another object of the invention is to provide a pyrometer of substantially universal application and one which may be used over a wide range of temperatures.

According to the Planck radiation law the energy emitted by a hot body in the wavelength region 0 to $\lambda_1$ is given by $$E_{0-\lambda_1} = \frac{C_1 T}{C_2} e^{-C_2/\lambda_1 T} \left[ \frac{1}{\lambda_1^3} \cdots \text{ and higher terms} \right]$$

where $C_1$ and $C_2$ are constant and $T$ is the absolute temperature, and provided that $$e^{C_2/\lambda_1 T} > 1$$

If, therefore, we take the energy emitted over two wavelength regions 0 to $\lambda_1$ and 0 to $\lambda_2$ the ratio between the two intensities will be of the form $$R = \frac{\lambda_1^3}{\lambda_2^3} \cdot e^{C_2/T \left( \frac{1}{\lambda_1} - \frac{1}{\lambda_2} \right)} [\text{where } \lambda_1 < \lambda_2]$$

This ratio may be written $$R = k e^{A/T}$$

Where $$k = \frac{\lambda_1^3}{\lambda_2^3}$$

and $$A = C_2 \left[ \frac{1}{\lambda_1} - \frac{1}{\lambda_2} \right]$$

In other words it is apparent that this ratio is an exponential function of temperature. It will be appreciated that the above statements involve some approximations but it can be demonstrated that these approximations are justified and do not seriously affect the use of this ratio as a measure of temperature.

The present invention therefore in one aspect provides a pyrometer comprising means for measuring a sample of the energy radiated by a body over a first range of wavelengths, from a given minimum up to a first upper limit, means for measuring a further sample of the energy radiated by said body over a second range of wavelengths from the same minimum up to a different upper limit and means for computing the ratio of the two quantities so measured to provide an indication of the temperature of said body.

A pyrometer according to the present invention may comprise a structure which will enable samples of the radiations from a hot body over the two selected wave bands to be measured separately and their ratio found and interpreted in terms of temperature. For this to be done effectively the two measurements must obviously be made by reference to strictly comparable samples of radiation from the hot body. This may be achieved by using a fixed optical system arranged to receive radiations from the hot body and focus them upon a sensitive detector such as a photo-conductive cell having a suitable sensitivity spectrum, or a thermopile. Two successive measurements are then taken, the first being taken with a filter interposed which limits the radiations incident on the detector to wavelengths in a band say 0 to $\lambda_1$, the second using the sensitivity spectrum of the detector device itself or a suitable filter to limit the radiations admitted to the detector to a band of wavelengths 0 to $\lambda_2$. A calibration chart may then be used to enable the ratio of the two measurements so made to be interpreted in terms of temperature.

An alternative arrangement, which is preferable, is to make an initial measurement, with a filter in position using radiations within the band 0 to $\lambda_1$ as before, the second measurement without the filter interposed and operating over the band 0 to $\lambda_2$ being controlled by means of a diaphragm such as an iris diaphragm in the optical system which is adjusted to provide a measured signal equal to that obtained without the filter present. The ratio required is then the ratio between the two apertures used to provide the equal output signals. The controlling device used for controlling this diaphragm may then be calibrated directly in temperature. Such a method may be regarded as a null method and automatically removes errors which may otherwise arise in the process of measuring the intensity of the radiations under the two conditions.

According to one aspect of the invention therefore there is provided a pyrometer comprising means for directing radiations from a body over two separate paths to a detector, means in at least one of said paths for restricting the band of wavelengths over which the path will transmit radiations, means for varying the ratio between the overall intensities transmitted through the respective paths, means for rendering each of said paths operative alternatively and means for comparing the signals generated in said detector due to radiations reaching it through the respective paths. With such an arrangement, adjustment of the ratio between the overall intensities transmitted through the respective paths so that equal signals are generated, gives a measurement of temperature directly. The comparison of the two signals can be effected, for example, by subtraction of the signals one from the other so that equality is indicated by a zero indication on, say, an electric voltage or current meter. Such an arrangement has all the advantages of a null method of measurement, and gives speed and simplicity of operation.

The detector preferred for the device according to the invention is a photo-conductive cell such as a lead sulphide cell. In order that the output from such a detector may be suitably amplified for operation of a meter the incoming radiation may be "chopped" at a suitable frequency by means of a rotating chopper disc.

The choice of filter material will be determined according to the temperature ranges within which measurements are to be made. It has been found that using a lead sulphide photo-conductive cell, filter materials which may be used are cellulose acetate and the material known by the registered trade mark "Perspex." In order to provide ratios of measurement, with and without a filter present, within the range of adjustment of the aperture, neutral filters serving to reduce the percentage of incident radiation passed to the detector may be used. In an example two such filters have been used in the form of wire gauze, one of which gave approximately 50% transmission of the incident radiation and the other approximately 15% transmission of the incident radiation. Temperatures within the following ranges have been successfully measured using filters of the four types above mentioned. For temperatures up to 550° C. a neutral filter of 50% transmission was used for the 0 to $\lambda_1$ measurement and a cellulose acetate filter $\frac{3}{32}''$ thick having an upper limit of transmission of 2.15 microns was used for the 0 to $\lambda_2$ measurement. Temperatures between 550° C. and 1200° C. have been measured using a neutral filter of 15% transmission and a Perspex filter 1 cm. thick having an upper limit of transmission of 1.75 microns. Temperatures from 800° C. to 1700° C. have been successfully measured using the neutral filter of 50% transmission and the Perspex filter 1 cm. thick. The choice of filter material will depend upon the range of temperatures to be measured and many varieties of materials could be chosen. The above materials are quoted only by way of example.

A pyrometer according to the invention capable of giving measurements accurately and rapidly and without the necessity for making two separate measurements will now be described by way of example with reference to the accompanying drawings in which:

Fig. 1 is a schematic plan view and

Figure 2:
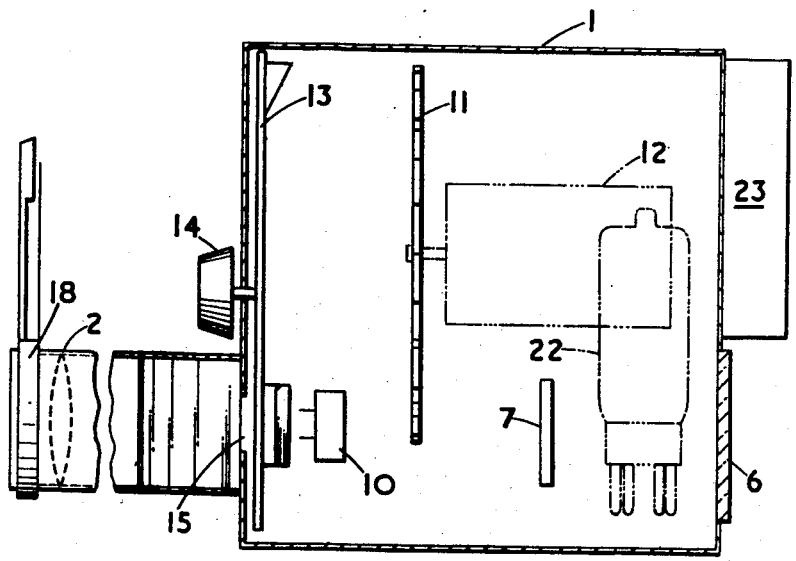

Fig. 2 a schematic elevational view of a pyrometer according to the invention.

Figure 3:
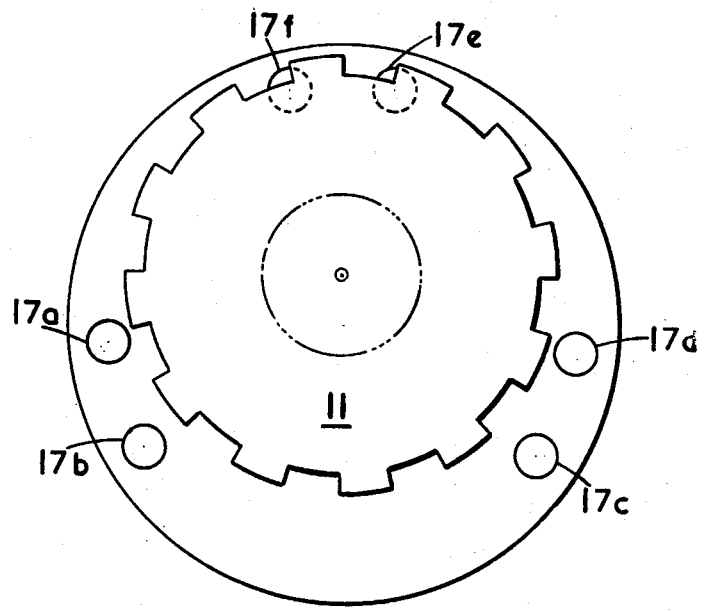

Fig. 3 represents a detail and

Figure 4:
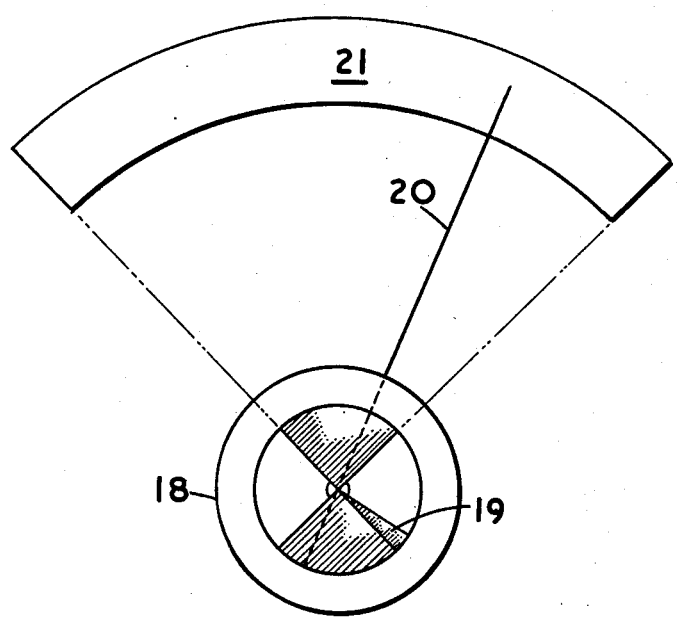

Fig. 4 a further detail of the apparatus shown in Figs. 1 and 2.

Figure 5:
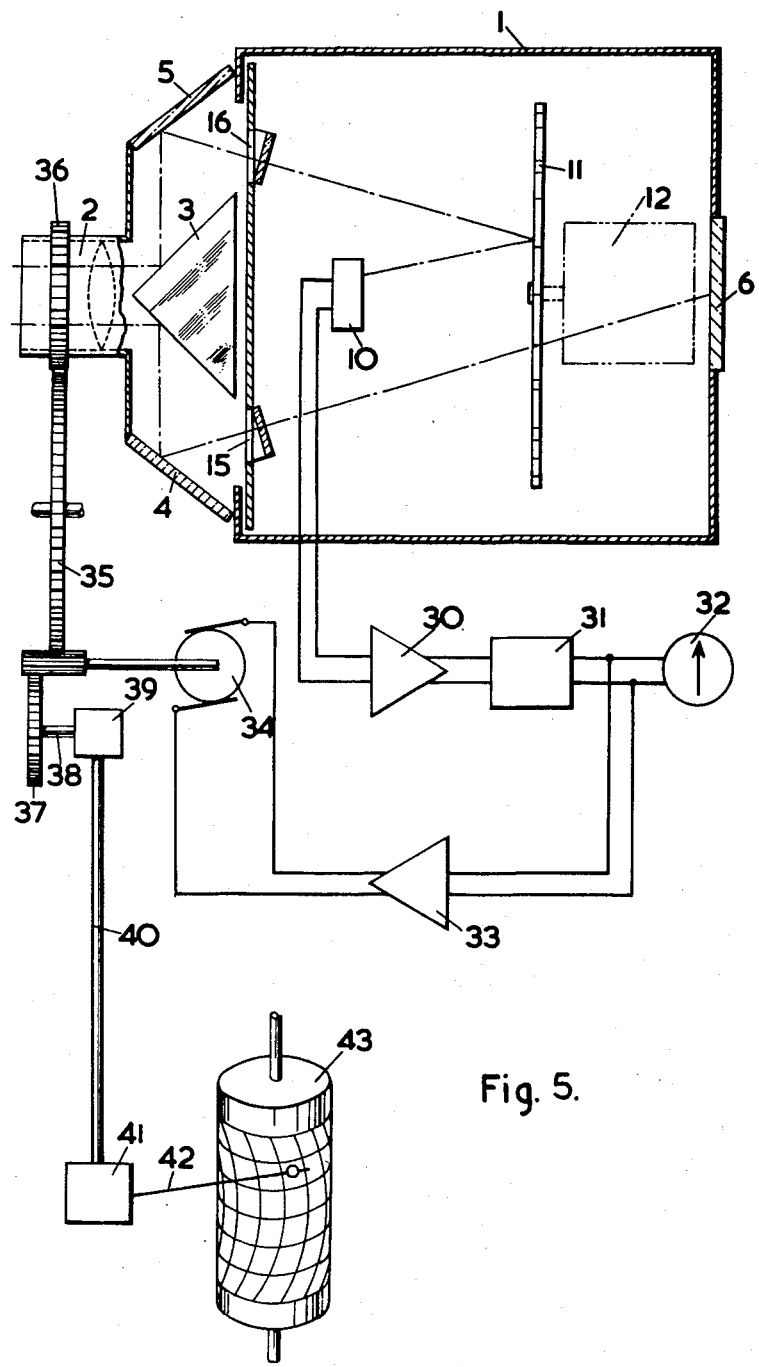

Fig. 5 is a schematic illustration of a further form of pyrometer according to the invention.

Referring to the drawings the apparatus comprises a light-tight casing 1 on the front of which there is mounted an optical system 2 comprising a lens, preferably mounted for axial adjustment for focussing purposes, behind which is located a beam splitting mirror wedge 3 which divides the incident beam into two outwardly directed beams. Further mirrors 4 and 5 are positioned to redirect the outwardly directed beams towards a translucent screen 6 provided on the rear wall of the casing which serves as a viewing screen by means of which the pyrometer may be focussed on a body or a point of a body the temperature of which is to be determined. Interposed in the paths of the two beams from the mirrors 4 and 5 is a further mirror 7 provided with a supporting rod 8 which extends outside the casing and terminates in a handle 9 by means of which this mirror may be withdrawn from the casing to enable the focussing adjustment, above referred to, to be carried out. When in place, the mirror 7 directs the two beams forwardly on to a detector, preferably as above described a lead sulphide cell, 10, which has an upper limit of sensitivity of approximately 2.7 microns, the two beams passing through an obturating shutter formed by the edge of a chopper disc 11 mounted on the shaft of a driving motor 12. The chopper disc 11 is shown in rear elevation in Fig. 3. It will be seen that this disc has a castellated edge, the teeth of which are of equal circumferential length to the spaces between them. The circumferential length of the teeth is chosen to equal the separation between each half beam at the point of chopping so that it will be seen that, as the chopper disc rotates, the two half beams will be alternately chopped or in other words the signals generated in the lead sulphide cell 10 by the two half beams will be 180° out of phase. For temperatures up to 550° C. a neutral filter of 50% transmission was used for the 0 to $\lambda_1$ measurement and a cellulose acetate filter $\frac{3}{32}''$ thick having an upper limit of transmission of 2.15 microns was used for the 0 to $\lambda_2$ measurement. Temperatures between 550° C. and 1200° C. have been measured using a neutral filter of 15% transmission and a Perspex filter 1 cm. thick having an upper limit of transmission of 1.75 microns. Temperatures from 800° C. to 1700° C. have been successfully measured using the neutral filter of 50% transmission and the Perspex filter 1 cm. thick. The choice of filter material will depend upon the range of temperatures to be measured and many varieties of materials could be chosen. The above materials are quoted only by way of example.

Rotatably mounted behind the front wall of the casing 1 is provided a disc 13 which may be rotated by means of a control knob 14 to bring into position in front of apertures 15 and 16 in the front casing through which the two half beams from mirrors 4 and 5 pass, any selected pair of six filters mounted on disc 13 and shown in Fig. 3 at 17a, 17b ... 17f. Filters 17b and 17c constitute one pair, 17d and 17e another pair and 17f and 17a a third pair. Each pair of filters comprises one filter providing the 0 to $\lambda_1$ band of wavelengths the other providing the 0 to $\lambda_2$ band of wavelengths, and is suitable for a given range of temperature measurements. For example they may be the three pairs of filters mentioned above for the three temperature ranges 200°–550° C., 550°–1200° C. and 800°–1700° C.

Arranged in front of the lens in the optical system 2 is provided a diaphragm shown in detail in Fig. 4 and indicated generally in Fig. 2 at 18. The diaphragm will be seen to comprise four 90° sectors, an upper sector and a lower sector both of which are permanently blanked out, the two clear sectors admitting two beams which will become the two half beams referred to above. One of the sectors (the right-hand sector in Fig. 4) can be covered to a variable extent by a movable vane 19 controlled by a lever 20. The vane 19, which lies behind the lower blanked out sector in the position in which it is shown in the drawing (as indicated by dotted lines) will encroach more and more over the right-hand sector as the lever 20 is swung anti-clockwise. The lever 20 extends upwardly into juxtaposition to a scale 21 from which the position of lever 20 may be read off.

The photo-conductive cell is connected to a suitable amplifier not shown, but one valve of which is indicated in dotted lines in Figs. 1 and 2 at 22. The output from the amplifier is rectified in a phase sensitive rectifier such, for example as that disclosed in British Patent No. 592,835 and applied to a centre-zero meter 23 mounted outside the casing 1.

The operation of the apparatus is as follows. The range of temperatures within which the temperature to be measured lies being known, the knob 14 is turned to bring the appropriate pair of filters 17 into their operative positions over the apertures 15 and 16. The mirror 7 is withdrawn from the casing, the apparatus is directed towards the body, the temperature of which is to be measured and focussed upon the point of interest by reference to the picture seen upon the ground glass screen 6 (assuming that the body is giving out visible radiations). The mirror 7 is then reinserted into position and the chopper disc 11 started. An output will now be recorded on the meter 23 and the lever 20 is moved until this output is reduced to zero. This will indicate that the output obtained from the photo-conductive cell 10 for each half beam incident on the cell is the same, or in other words that the ratio between the two sector apertures of the diaphragm 18 has been brought to the appropriate value, so that the position of the lever 20 on the scale 21 is indicative of the temperature to be measured and the temperature may be read off directly.

Fig. 5 shows a further form of pyrometer according to the invention, constituting a development of the pyrometer above described with reference to Figs. 1 to 4. In Fig. 5 parts corresponding to those shown in the preceding figures have been corresponding numbered. In the Fig. 5 arrangement the chopper disc 11 is shown situated nearer the rear of the apparatus and in this example has its front face silvered or polished so that it serves itself to reflect the incident rays forwardly on to the lead sulphide cell 10. This renders the mirror 7 of the arrangement previously described unnecessary. The profile of disc 11 is, of course, such that only one of the two incident beams is reflected at a time, so that at all times either one or other of the two beams will pass through to the screen 6 at the back of the casing. This arrangement therefore presents a further advantage, namely that a picture of the hot body under test is presented on the screen 6 at all times (assuming of course that visible radiations are present).

In Fig. 5 there is also shown schematically the provision of arrangements for rendering the pyrometer self-adjusting and for recording the temperature measured by the apparatus continuously. In the arrangement shown the output of cell 10 is fed to an amplifier 30 and thence to a phase-sensitive rectifier 31 which provides a positive or negative output according to the sense of the inequality between the two sets of signals generated by the two radiant beams. This output is fed to a centre-zero meter 32 for monitoring purposes, and also to a further amplifier 33, the output of which drives a servomotor 34 in one sense or the other according to the sign of the error signal output. The motor 34, through a suitable gear wheel 35, drives shutter 19 (see Fig. 4) through a toothed ring 36 on which the shutter 19 is mounted and it is arranged that the direction in which this shutter is driven is so related to the error signal detected by phase-sensitive-rectifier 31 that the error signal is reduced. With the arrangement properly adjusted the error signal indicated on meter 32 can be kept substantially at zero. The position of shutter 19 at all times represents the temperature to be measured. Accordingly these movements are reproduced, through gear wheel 37 coupled to the servomotor shaft, shaft 38, gear box 39, shaft 40 and gear box 41 as movements of a recording pen 42 which operates upon a recording drum 43 which may be turned in wellknown manner by any suitable clockwork mechanism of known form.

If desired, of course, the signal from amplifier 33 might alternatively, be used to effect control of the temperature being measured, so that the device will then operate as a thermostat.

The arrangements described in detail by way of example with reference to the drawings, involve a number of desirable refinements which will be obvious to those skilled in the art. It will be apparent, however, that many different forms of pyrometer can be constructed in accordance with the invention. The particular optical arrangement described, for example, can be departed from in a number of different ways. Thus, in some circumstances, it may be preferred to use separate apertures for the two component beams, using separate optical systems. In such an arrangement it would of course be desirable to provide an adjustment of such a double optical system whereby the two object lenses may be "toed-in" upon a common point of interest.

The advantages afforded by a pyrometer according to the invention over other known forms of pyrometer are numerous, the most important, however, being the following:

(a) The principle employed according to the invention of making a ratio comparison, eliminates any error due to difference in the absolute emissivities of bodies to be examined. As, moreover, the emissivity is a function of temperature as serious source of confusion and unreliability is eliminated.

(b) A pyrometer can be constructed according to the invention to measure temperatures at least down to 200° C., that is to say for temperatures much below the lower limit for some other types of pyrometer, i. e. those not using photo-conductive cells or like detectors sensitive in the longer infra-red wavelength regions.

(c) A pyrometer according to the invention is liable to be less susceptible to errors due to atmospheric conditions than known forms of pyrometer.

(d) Measurements made with a pyrometer according to the invention are independent of the size of the source and the distance away of the source. There is no need therefore, for the pyrometer to be calibrated in situ.

(e) If the law by which the shutter or diaphragm controls the ratio between the two incident radiation intensities is matched to the law relating this ratio to temperature, the measurement may be made on a linear scale.

(f) By employing a null method, as in some of the examples of pyrometer according to the invention mentioned and described above, errors due to deterioration or failure of electrical components are eliminated.

(g) By suitably "strobing" the operation of the pyrometer it becomes possible to measure the temperature of a cyclically moving part for example a particular spot on the periphery of a rotating wheel, so long as it is possible to synchronise the exposure of the pyrometer with the cyclic movements of the body in question. Alternatively, without the necessity of "strobing," it is possible to measure the temperature of a part intermittently exposed to the pyrometer, provided with the intermittent exposures are long in duration compared with the "chopping" frequency at which the incident radiation beams are interrupted.

(h) A pyrometer according to the invention may be arranged to operate on a very small viewed area so that it is possible to study the temperature distribution across a surface.

(i) It is possible, again by "strobing" the operation of the device, to examine a particular part of a recurrent temperature cycle.

The choice of detector will depend upon the filters used and upon the range of temperatures for which the particular pyrometer is intended. Photo-conductive cells will in general provide the most satisfactory choice of detector in view of the speed of operation which can be obtained with photo-conductive cells and the desirable spectral response characteristics available in this type of radiation detector.

I claim:

1. A radiation pyrometer comprising in combination, a detector, radiation receiving and directing means for directing radiations from a hot body through two separate paths toward said detector sensitive to said radiations over a range of wavelengths extending from a given minimum wavelength at which the energy content of radiations is negligible to a first upper limit located in the infra-red range of wavelengths, said detector being adapted to produce signals related to the intensity of radiations incident upon said detector, filter means in one of said paths for limiting the radiations passing therethrough to a range of wavelengths extending from the minimum wavelength to which said detector is sensitive up to a second upper limit located in the infra-red range by wavelengths and substantially below said first upper limit, means for rendering each of said paths operative in turn to expose said detector to the radiations traversing the respective path, means for comparing the intensities of the signals set up when one of said paths is operative with the signals set up when the other of said paths is operative, shutter means in the path other than that including said filter, means for adjusting said shutter and indicating means associated with said adjusting means, said indicating means being calibrated in terms of the temperature to be inferred from the adjustment applied to said adjusting means to bring to equality the signals set-up by the radiations passing through the respective paths, said indicating means giving an indication of temperature based on the following relationship:

$$R = \frac{\lambda_1^3}{\lambda_2^3} \cdot (e)^{\frac{C_2 \left[ \frac{1}{\lambda_1} - \frac{1}{\lambda_2} \right]}{T}}$$

where:
$C_2$ is a constant,
T is the absolute temperature,
$\lambda_2$ and $\lambda_1$ are said maximum and said upper limit respectively; and
R is the ratio of the intensity of the shorter range to the intensity of the longer range.

2. A radiation pyrometer comprising in combination, a detector, radiation receiving and directing means for directing radiations from a hot body through two separate paths toward said detector sensitive to said radiations, said detector adapted to produce signals related to the intensity of radiations incident upon said detector, filter means in one of said paths for limiting the radiations passing therethrough to a range of wavelengths extending from a minimum wavelength at which the energy content of the radiations is negligible up to a first upper limit located in the infra-red range of wavelengths, means for rendering each of said paths operative in turn to expose said detector to the radiations traversing the respective path, filter means in the other of said paths for limiting the radiations passing therethrough to a range of wavelengths extending from the same minimum wavelength up to a second upper limit located in the infra-red range of wavelengths and substantially below said first upper limit, means for comparing the magnitudes of the signals set up when one of said paths is operative with the signals set up when the other of said paths is operative, shutter means in one of said paths, means for adjusting said shutter and indicating means associated with said adjusting means, said indicating means being calibrated in terms of the temperature to be inferred from the adjustment applied to said adjusting means to bring to equality the signals set up by the radiations passing through the respective paths, said indicating means giving an indication of temperature based on the following relationship:

$$R = \frac{\lambda_1^3}{\lambda_2^3} \cdot (e)^{\frac{C_2 \left[ \frac{1}{\lambda_1} - \frac{1}{\lambda_2} \right]}{T}}$$

where:
$C_2$ is a constant,
T is the absolute temperature,
$\lambda_2$ and $\lambda_1$ are said maximum and said upper limit respectively; and
R is the ratio of the intensity of the shorter range to the intensity of the longer range.

3. A pyrometer comprising in combination a radiation receiving optical system, said optical system including an aperture, a beam-splitting mirror wedge positioned behind said aperture and two side mirrors flanking said beam-splitting mirror, each positioned to receive on side beam from said beam-splitting mirror and adapted to direct the respective beams rearwardly, a filter-carrier mounted behind said side mirrors, filters carried by said filter-carrier and arranged in pairs so as to be positioned at will in the paths of said side beams with one filter of a pair in one side beam adapted to pass a range of wavelengths from a predetermined minimum at which the energy content of the radiations is negligible to a first maximum located in the infra-red range of wavelengths and the other filter of the pair in the other side beam adapted to pass a range of wavelengths from the same minimum to a second maximum located in the infra-red range of wavelengths and substantially less than said first maximum, each pair of filters having said other filter arranged to have a different second maximum wavelength thereby providing a different range of temperature measurement, a detector, reflecting means behind said filter-carrier positioned to redirect said side beams forwardly toward said detector sensitive to radiations and adapted to produce signals in response thereto, obturating means and driving means therefor, for obturating each side beam alternately, signal amplifying means coupled to said detector, a phase-sensitive rectifier coupled to said amplifying means for determining by reference to the phase of the signal resulting from the radiations reaching the detector in each side beam the state of unbalance between the two side beams and provided with a meter for indicating said state, and means for adjusting the intensity of one of said side beams, said adjusting means having associated therewith an indicating means giving an indication of temperature based on the following relationship:

$$R = \frac{\lambda_1^3}{\lambda_2^3} \cdot (e)^{\frac{C_2\left[\frac{1}{\lambda_1}-\frac{1}{\lambda_2}\right]}{T}}$$

where:
$C_2$ is a constant,
T is the absolute temperature,
$\lambda_2$ and $\lambda_1$ are said maximum and said upper limit respectively; and
R is the ratio of the intensity of the shorter range to the intensity of the longer range.

4. A pyrometer comprising in combination a radiation receiving optical system, said optical system including an aperture, a beam-splitting mirror wedge positioned behind said aperture and two side mirrors flanking said beam-splitting mirror, each positioned to receive one side beam from said beam-splitting mirror and oriented to direct the respective beams rearwardly, a filter-carrier mounted behind said side mirrors, filters carried by said filter-carrier and arranged in pairs so as to be positioned at will in the paths of said side beams with one filter of a pair in one side beam adapted to pass a range of wavelengths from a predetermined minimum at which the energy content of the radiations is negligible to a first maximum located in the infra-red range of wavelengths and the other filter of the pair in the other side beam adapted to pass a range of wavelengths from the same minimum to a second maximum located in the infra-red range of wavelengths and substantially less than said first maximum, each pair of filters having said other filter arranged to have different second maximum wavelengths thereby providing a different range of temperature measurement, a detector, an obturating shutter behind said filter-carrier, said shutter having a reflecting face and being formed with cut-away portions so as to reflect forwardly toward said detector sensitive to radiations and adapted to produce signals in response thereto one side beam while allowing passage through one of said cut-away portions for the other side beam, driving means for said shutter whereby the side beams reflected and allowed to pass are constantly interchanged, signal amplifying means coupled to said detector, a phase-sensitive rectifier coupled to said amplifying means for determining by reference to the phase of the signal resulting from the radiations reaching the detector in each side beam the state of unbalance between the two side beams and provided with a meter for indicating said state, and means for adjusting the intensity of one of said side beams, said last named means comprising a shutter and adjustment means for said shutter, said adjustment means being calibrated in terms of the ratio of the intensities of the two side beams determined by said adjustment, said adjustment means giving an indication of temperature based on the following relationship:

$$R = \frac{\lambda_1^3}{\lambda_2^3} \cdot (e)^{\frac{C_2\left[\frac{1}{\lambda_1}-\frac{1}{\lambda_2}\right]}{T}}$$

where:
$C_2$ is a constant,
T is the absolute temperature,
$\lambda_2$ and $\lambda_1$ are said maximum and said upper limit respectively; and
R is the ratio of the intensity of the shorter range to the intensity of the longer range.

5. A pyrometer as claimed in claim 4 in which a screen is provided behind said shutter, positioned to receive the side beams whenever they pass through a cut-away portion of said shutter, to present a visual indication of the radiations entering through said aperture.

6. A pyrometer as claim in claim 5, wherein said adjustment means comprises an adjustable shutter positioned behind said aperture to control the intensity of one of said side beams.

7. A pyrometer as claimed in claim 6, comprising a servo-control means having an output shaft connected to said phase sensitive rectifier to receive an out-of-balance signal therefrom, the output shaft of said servo-control means being coupled to said shutter whereby said shutter is operated in the appropriate sense to reduce said out-of-balance signal.

8. A pyrometer as claimed in claim 7, comprising recording means coupled to said adjustable shutter whereby variations of adjustment of the shutter are recorded.

9. A radiation pyrometer comprising a detector, radiation receiving and directing means for directing radiations from a hot body through two separate paths toward said detector sensitive to said radiations over a range of wavelengths from a predetermined minimum at which the energy content is negligible to a maximum located in the infra-red range of wavelengths, said detector being adapted to produce signals related to the intensity of said radiations incident upon said detector, filter means in one of said paths for limiting the radiations passing therethrough to a range of wavelengths extending from said predetermined minimum to an upper limit substantially below said maximum located in the infra-red range of wavelengths, means for rendering each of said paths operative in turn to expose said detector to the radiations traversing the respective path, and means for comparing the intensities of the signals set up when one of said paths is operative with the signals set up when the other of said paths is operative, said means for comparing giving an indication of temperature based on the following relationship:

$$R=\frac{\lambda_1^5}{\lambda_2^5} \cdot (e)^{\frac{C_2\left[\frac{1}{\lambda_1}-\frac{1}{\lambda_2}\right]}{T}}$$

where:
- $C_2$ is a constant,
- $T$ is the absolute temperature,
- $\lambda_2$ and $\lambda_1$ are said maximum and said upper limit respectively; and
- $R$ is the ratio of the intensity of the shorter range to the intensity of the longer range.

10. A pyrometer according to claim 9, and means for adjusting the relative magnitudes of the samples of radiation traversing the respective paths, to permit a direct comparison of said ratio of intensities.

11. A pyrometer as claimed in claim 10 comprising a shutter included in one of said paths and adjusting means for said shutter.

12. A pyrometer as claimed in claim 11, wherein the adjusting means for said shutter include an indicator and cooperating scale calibrated in terms of the temperature to be inferred from the adjustment applied to said means to bring to equality the signals set up by radiations passing through the respective paths.

13. A pyrometer as claimed in claim 3 in which said reflecting means is removable from the path of at least one of said side beams and a screen is provided, positioned to receive said beams to provide a display of the radiations entering said aperture.

14. A pyrometer comprising, a detector, radiation receiving and directing means for directing radiations from a hot body through two separate paths toward said detector sensitive to said radiations over a range of wavelengths from a predetermined minimum at which the energy content is negligible to a maximum located in the infra-red range of wavelengths, said detector being adapted to produce signals related to the intensity of said radiations incident upon said detector, an adjustable shutter arranged in one of said paths for adjusting the magnitude of the sample of radiations passing through said path, a filter arranged in the other of said paths adapted to limit the radiations passing through said path to a range of wavelengths extending from said predetermined minimum to an upper limit located in the infra-red range of wavelengths and substantially below the upper limit of sensitivity of said detector, an obturating shutter for obturating each path alternatively, driving means for said obturating shutter, signal amplifying means connected to said detector, a phase-sensitive rectifier connected to receive the signals from said amplifying means, an indicator connected to receive the rectified signals adapted to indicate the state of unbalance between the signals set up in said detector by radiations reaching it through the respective paths, said adjustable shutter being coupled to index means calibrated in terms of the ratio of the intensities of the respective radiation paths, said index means giving an indication of temperature based on the following relationship:

$$R=\frac{\lambda_1^5}{\lambda_2^5} \cdot (e)^{\frac{C_2\left[\frac{1}{\lambda_1}-\frac{1}{\lambda_2}\right]}{T}}$$

where:
- $C_2$ is a constant,
- $T$ is the absolute temperature,
- $\lambda_2$ and $\lambda_1$ are said maximum and said upper limit respectively; and
- $R$ is the ratio of the intensity of the shorter range to the intensity of the longer range.

References Cited in the file of this patent

UNITED STATES PATENTS

| Number | Name | Date |
|---|---|---|
| 1,932,337 | Dowling | Oct. 24, 1933 |
| 2,166,824 | Runaldue | July 18, 1939 |
| 2,292,230 | Lemon | Aug. 4, 1942 |
| 2,439,373 | Stearns | Apr. 6, 1948 |

FOREIGN PATENTS

| Number | Country | Date |
|---|---|---|
| 389,214 | Great Britain | Mar. 16, 1933 |
| 20,127 | Australia | Nov. 22, 1935 |
| 508,802 | Great Britain | July 5, 1939 |